(12) United States Patent
Anderson et al.

(10) Patent No.: US 12,669,691 B2
(45) Date of Patent: Jun. 30, 2026

(54) REFLECTIVE FOURIER PTYCHOGRAPHY IMAGING OF LARGE SURFACES

(71) Applicant: Lam Research Corporation, Fremont, CA (US)

(72) Inventors: Collin Michael Anderson, Berkeley, CA (US); Roderick Mosely, Pleasanton, CA (US); Nerissa Sue Draeger, Fremont, CA (US); Jerome S. Hubacek, Fremont, CA (US)

(73) Assignee: Lam Research Corporation, Fremont, CA (US)

( * ) Notice: Subject to any disclaimer, the term of this patent is extended or adjusted under 35 U.S.C. 154(b) by 16 days.

(21) Appl. No.: 17/781,643

(22) PCT Filed: Nov. 24, 2020

(86) PCT No.: PCT/US2020/062108
§ 371 (c)(1),
(2) Date: Jun. 1, 2022

(87) PCT Pub. No.: WO2021/113131
PCT Pub. Date: Jun. 10, 2021

(65) Prior Publication Data
US 2022/0413276 A1     Dec. 29, 2022

Related U.S. Application Data

(60) Provisional application No. 62/942,636, filed on Dec. 2, 2019.

(51) Int. Cl.
G02B 21/14        (2006.01)
G01N 21/47        (2006.01)
(Continued)

(52) U.S. Cl.
CPC ......... G02B 21/14 (2013.01); G01N 21/4795 (2013.01); G01N 21/8806 (2013.01);
(Continued)

(58) Field of Classification Search
CPC ................ G02B 21/14; G02B 21/0032; G02B 21/0036; G02B 21/082; G02B 21/367;
(Continued)

(56) References Cited

U.S. PATENT DOCUMENTS

2016/0154301 A1* 6/2016 Ekinci ...................... G03F 1/84
                                                            250/372
2016/0178883 A1* 6/2016 Horstmeyer ......... G02B 21/367
                                                            348/80
(Continued)

FOREIGN PATENT DOCUMENTS

CN        106707486        5/2017
CN        115053122        9/2022
(Continued)

OTHER PUBLICATIONS

Pacheco, Reflective Fourier ptychography, 2016, Journal of Biomedical Optics, 21 (2) (Year: 2016).*
(Continued)

*Primary Examiner* — Pinping Sun
(74) *Attorney, Agent, or Firm* — Schwegman Lundberg & Woessner, P.A.

(57)        ABSTRACT
Various embodiments include reflective-mode Fourier ptychographic microscope (RFPM) apparatuses and methods for using the RFPM. In one example, the RFPM includes a multiple-component light source configured to direct radiation to a surface. The multiple-component light source has a number of individual-light sources, each of which is configured to be activated individually. The RFPM further includes collection optics to receive radiation reflected and
(Continued)

scattered or otherwise redirected from the surface, and a sensor element to convert received light-energy from the collection optics into an electrical-signal output. Other apparatuses, designs, and methods are disclosed.

29 Claims, 3 Drawing Sheets

(51) Int. Cl.
| | | |
|---|---|---|
| *G01N 21/88* | (2006.01) | |
| *G02B 21/00* | (2006.01) | |
| *G02B 21/08* | (2006.01) | |

(52) U.S. Cl.
CPC ..... *G01N 21/8851* (2013.01); *G02B 21/0032* (2013.01); *G02B 21/0036* (2013.01); *G02B 21/082* (2013.01)

(58) Field of Classification Search
CPC .......... G01N 21/8806; G01N 21/4795; G01N 21/8851; G01N 2021/8883
See application file for complete search history.

(56) References Cited

U.S. PATENT DOCUMENTS

| | | | |
|---|---|---|---|
| 2016/0341945 A1 | 11/2016 | Ou et al. | |
| 2017/0115557 A1* | 4/2017 | Peters .................... | G01N 21/33 |
| 2017/0146788 A1 | 5/2017 | Waller et al. | |
| 2017/0184981 A1* | 6/2017 | Quintanilha .......... | G03F 7/7065 |
| 2018/0048811 A1 | 2/2018 | Waller et al. | |
| 2018/0073993 A1* | 3/2018 | Zhao .................... | G06T 7/0004 |
| 2018/0316855 A1* | 11/2018 | Ou .......................... | H04N 23/56 |
| 2019/0331902 A1* | 10/2019 | Ou ....................... | G02B 21/367 |
| 2021/0295495 A1* | 9/2021 | Li .......................... | G02B 21/14 |

FOREIGN PATENT DOCUMENTS

| | | |
|---|---|---|
| JP | 2015535348 | 12/2015 |
| JP | 2016530567 | 9/2016 |
| JP | 2018504577 | 2/2018 |
| JP | 2018504627 | 2/2018 |
| JP | 2023504151 | 2/2023 |
| JP | 7678810 B2 | 5/2025 |
| JP | 2025111782 A | 7/2025 |
| KR | 20190088277 A | 7/2019 |
| WO | WO-2016101008 A1 | 6/2016 |
| WO | WO-2016187591 A1 | 11/2016 |

OTHER PUBLICATIONS

Fitzgerald, Advanced Low-k Die Singulation Defect Inspection and Pre-emptive Singulation Defect Detection, 37th International Electronic Manufacturing Technology Conference, 2016 (Year: 2016).*
Chen et al, Polarization and Phase-Shifting for 3D Scanning of Translucent Objects, IEEE, 2007 (Year: 2007).*
Ledwig et al, Epi-mode tomographic quantitative phase imaging in thick scattering samples, Biomedical Optics Express, Jun. 26, 2019 (Year: 2019).*
"International Application Serial No. PCT US2020 062108, International Preliminary Report on Patentability mailed Jun. 16, 2022", 8 pgs.
International Application Serial No. PCT/US2020/062108, International Search Report mailed Mar. 16, 2021, 3 pgs.
International Application Serial No. PCT/US2020/062108, Written Opinion mailed Mar. 16, 2021, 6 pgs.
Aidukas, Tomas, et al., "Low-cost, sub-micron resolution, wide-field computational microscopy using opensource hardware", Scientific Reports, 9:7457, (May 15, 2019), 12 pgs.
Bostan, Emrah, et al., "Learning-based Image Reconstruction via Parallel Proximal Algorithm", IEEE Signal Processing Letters, 25(7), arXiv:1801.09518v1, (Jan. 29, 2018), 9 pgs.

Chen, Michael, et al., "3D differential phase contrast microscopy", Biomedical Optics Express, 7(10), (Oct. 2016), 11 pgs.
Chowdhury, Shwetadwip, et al., "High-resolution 3D refractive index microscopy of multiple-scattering samples from intensity images", Optica, 6(9), (Sep. 2019), 9 pgs.
Guo, Kaikai, et al., "Fourier Ptychography for Brightfield, Phase, Darkfield, Reflective, Multi-Slice, and Fluorescence Imaging", IEEE Journal of Selected Topics in Quantum Electronics, 22(4), (Jul.-Aug. 2016), 12 pgs.
Kellman, Michael, et al., "Data-Driven Design for Fourier Ptychographic Microscopy", IEEE International Conference on Computational Photography (ICCP), arXiv:1904.04175v1, (Apr. 8, 2019), 8 pgs.
Kellman, Michael R., et al., "Physics-Based Learned Design: Optimized Coded-Illumination for Quantitative Phase Imaging", IEEE Transactions on Computational Imaging, 5(3), (Sep. 2019), 10 pgs.
Lee, et al., "Reflective Fourier Ptychographic Microscopy Using A Parabolic Mirror", Optics express, vol. 27, No. 23, (Nov. 11, 2019), 34382-34391.
Liu, Ziji, et al., "Real-time brightfield, darkfield, and phase contrast imaging in a lightemitting diode array microscope", Journal of Biomedical Optics 19(10), 106002, (Oct. 2014), 6 pgs.
Matlock, Alex, et al., "First Born model for reflection-mode Fourier ptychographic microscopy", Imaging and Applied Optics, Optical Society of America, (2018), 2 pgs.
Monakhova, Kristina, et al., "Learned reconstructions for practical mask-based lensless imaging", Optics Express, 27(20), (Sep. 30, 2019), 16 pgs.
Pacheco, Shaun, et al., "Reflective Fourier ptychography", J. Biomed. Opt., 21(2), (Feb. 18, 2016), 7 pgs.
Phillips, Zachary Fitzgerald, "Quantitative Microscopy using Coded Illumination", Ph.D Dissertation in Applied Science and Technology at the University of California, Berkeley, (2019), 138 pgs.
Pinkard, Henry, et al., "Deep learning for single-shot autofocus microscopy", Optica, 6(6), (Jun. 2019), 4 pgs.
Tian, Lei, et al., "Multiplexed coded illumination for Fourier Ptychography with an LED array microscope", Biomedical Optics Express 5(7), (2014), 14 pgs.
Waller, Laura, et al., "Computational imaging: Machine learning for 3D microscopy", Nature 523(7561), (2015), 416-417.
Yeh, Li-Hao, et al., "Experimental robustness of Fourier ptychography phase retrieval algorithms", Optics Express, 23(26), (2015), 27 pgs.
Zhang, Yongbing, et al., "Self-learning based Fourier ptychographic microscopy", Optics Letters 23(14), (2015), 16 pgs.
"Korean Application Serial No. 10-2022-7022550, Voluntary Amendment Filed Nov. 20, 2023", w English Claims, 4 pgs.
"Japanese Application Serial No. 2022-532572, Notification of Reasons for Refusal mailed Oct. 8, 2024", w English Translation, 6 pgs.
"Taiwanese Application Serial No. 109142173, Office Action mailed Aug. 30, 2024", w/ English Translation, 22 pgs.
"Japanese Application Serial No. 2022-532572, Response filed Dec. 27, 2024 to Notification of Reasons for Refusal mailed Oct. 8, 2024", w English Claims, 17 pgs.
"Taiwanese Application Serial No. 109142173, Response filed Nov. 28, 2024 to Office Action mailed Aug. 30, 2024", w English claims, 39 pgs.
Japanese Application Serial No. 2025-076559, Voluntary Amendment filed May 19, 2025, with English claims, 14 pgs.
Korean Application Serial No. 10-2022-7022550, Notice of Preliminary Rejection mailed Aug. 6, 2025, W/ English Translation, 13 pgs.
Taiwanese Application Serial No. 109142173, Decision of Rejection mailed Apr. 9, 2025, w/ English Translation, 7 pgs.
Taiwanese Application Serial No. 109142173, Office Action mailed Jul. 29, 2025, w/o English Translation, 9 pgs.
Taiwanese Application Serial No. 109142173, Office Action mailed Aug. 12, 2025, w/ English Translation, 17 pgs.
Taiwanese Application Serial No. 109142173, Response filed Jun. 6, 2025 to Decision of Rejection mailed Apr. 9, 2025, w/English claims, 32 pgs.

(56) References Cited

OTHER PUBLICATIONS

Chung, Jaebum, et al., "Wide-field Fourier ptychographic micros-copy using laser illumination source", Biomedical Optics Express, the ILS. Optica Publishing Group, Issue 11, vol. 7, (Oct. 31, 2016), 4787-4802.

Lee, Byounghyo, et al., "Single-shot phase retrieval via Fourier ptychographic microscopy", Optica Publishing Group, Issue 8, vol. 5, (Aug. 8, 2018), 976-983.

Sun, Jiasong, et al., "High-speed Fourier ptychographic microscopy based on programmable annular illuminations", Scientific Reports and Nature Publishing Group, vol. 8, Issue, (May 16, 2018), 1-12.

"Taiwanese Application Serial No. 109142173, Office Action mailed Jul. 29, 2025", w Machine English Translation, 25 pgs.

"Korean Application Serial No. 10-2022-7022550, Response filed Dec. 4, 2025 to Notice of Preliminary Rejection mailed Aug. 6, 2025", W English Claims, 18 pgs.

"Taiwanese Application Serial No. 109142173, Office Action mailed Feb. 10, 2026", W Machine English Translation, 18 pgs.

* cited by examiner

REFLECTIVE FOURIER PTYCHOGRAPHY IMAGING OF LARGE SURFACES

CLAIM OF PRIORITY

This application is a U.S. National Stage Filing under 35 U.S.C. 371 from International Application No. PCT/US2020/062108, filed on Nov. 24, 2020, and published as WO 2021/113131 A1 on Jun. 10, 2021, which claims the priority benefit to U.S. Patent Application Ser. No. 62/942, 636, filed on 2 Dec. 2019, and entitled "REFLECTIVE FOURIER PTYCHOGRAPHY IMAGING OF LARGE SURFACES," each of which is incorporated by reference herein in its entirety.

TECHNOLOGY FIELD

The disclosed subject matter is generally related to the field of detecting defects on surfaces and near surfaces (sub-surface defects). More specifically, the disclosed subject matter is related to automated detection of defects using a reflective Fourier ptychography system.

BACKGROUND

Contemporaneous camera inspection techniques for surfaces utilize either expensive cameras with large fields of view and low resolution, or systems with high magnification and high resolution but coupled with a small field-of-view. For example, current machine-vision technologies cannot inspect the surface of an entire part (which may be, for example, approximately 0.25 m² in area) in a timely manner with sufficient resolution.

One prior-art system utilizing transmissive mode techniques allows for high-magnification techniques while using collection optics have a small numerical aperture, thereby allowing sampling of a larger image area. With reference to FIG. 1, a simplified diagram of a transmissive-mode, Fourier ptychographic microscope (TFPM) apparatus 100 of the prior art is shown having multiplexed illumination in the form of a programmable LED array 110. The TFPM apparatus 100 uses a conventional brightfield microscope 120 with the programmable LED array 110 as a light source. The programmable LED array 110 allows deliberate patterning of illumination 101 at a Fourier plane 109 of a sample 103. Light 105 from the sample 103 is directed through a first optical lens 107 and a second optical lens 111 of the brightfield microscope 120. Transmissive light 113 is received by an imaging device 115. The imaging device 115 may comprise a camera. Image data obtained from the imaging device 115 is electrically coupled to a computing device 117. The image data are transferred from the imaging device 115 to the computing device 117 for processing and eventual display on a monitor (not shown).

The LED array 110 includes a programmable controller (not shown but understandable to a person of ordinary skill in the art) that is configured to illuminate one or more of the light emitting diodes arranged over a face of the LED array 110, as a function of time, in a predetermined pattern and temporal sequence. The diagram of FIG. 1 therefore shows a prior-art system using Fourier ptychography, which enables one to use a low numerical-aperture (NA) objective lens having a large field-of-view (FOV). Even with the low NA objective lens, the Fourier ptychography apparatus is able obtain a high level of resolution across the entire image due to the various light sources and generated patterns of light. In addition to the LED array 110 shown, various prior art examples of Fourier ptychographic microscope apparatuses also use an illumination source (e.g., an LED) that can be tilted and repositioned with regard to a sample.

However, even though the TFPM apparatus 100 and similar prior-art apparatuses have a number of useful applications for transmissive types of microscopy, the TFPM apparatus 100 is only useful for objects that allow light to be transmitted therethrough (e.g., biological samples). Therefore, the TFPM apparatus 100 is not adaptable to reflective microscopy and imaging techniques. Further, the TFPM apparatus 100 is not readily adaptable to scanning large samples having surface areas as noted above.

The information described in this section is provided to offer the skilled artisan a context for the following disclosed subject matter and should not be considered as admitted prior art.

DETAILED DESCRIPTION

Figure 1:
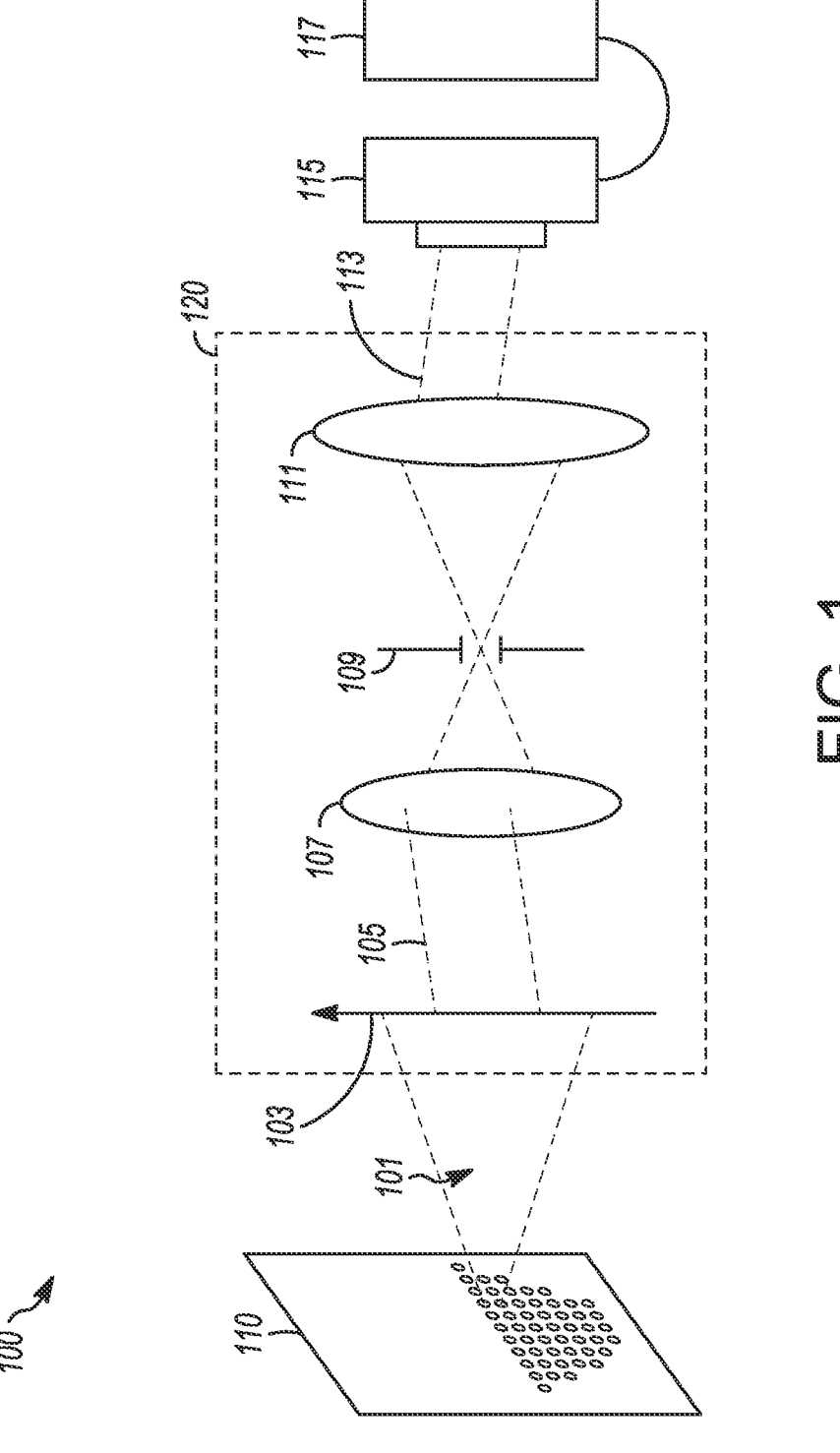
FIG. 1 shows a simplified diagram of a transmissive-mode, Fourier ptychographic microscope apparatus of the prior art having multiplexed illumination in the form of a programmable LED array.

The description that follows includes illustrative examples, devices, and apparatuses that embody various aspects of the disclosed subject matter. In the following description, for purposes of explanation, numerous specific details are set forth in order to provide an understanding of various embodiments of the inventive subject matter. It will be evident however, to those of ordinary skill in the art, that various embodiments of the disclosed subject matter may be practiced without these specific details. Further, well-known structures, materials, and techniques have not been shown in detail, so as not to obscure the various illustrated embodiments.

Various exemplary embodiments discussed below focus on a reflective-mode Fourier ptychography microscopy (RFPM) apparatus. Upon reading and understanding the disclosure provided herein, a person of ordinary skill in the art will readily understand that the various techniques, designs, and examples may all be applied in various combinations. As an introduction to the subject, a few embodiments will be described briefly and generally in the following paragraphs, and then a more detailed description, with reference to the figures, will ensue.

Current inspection systems and methods used by manufacturers to inspect parts rely on techniques including both human inspection, to detect large defects (e.g., having a "diameter" of approximately 500 μm and larger) in the part, and machine inspection in which a small percentage of the surface of the part is inspected to detect small defects (e.g., approximately 10 μm and larger). These inspection systems and methods used by various manufacturers (e.g., manufacturers of semiconductor process and metrology tools) generally inspect only about 0.0003% to about 0.0007% of the surface of a part and use this small sample to extrapolate and make an assumption about the quality of the entire part. This small inspected-percentage of the part only gives a confidence of about 2% to about 4% that the inspected surface represents an actual quality state of the part. The reason that the contemporary systems and methods inspect only a very small percentage of a part is based on the physics of optics, as described briefly below.

As is understood by a person of ordinary skill in the art, microscopy-based inspection systems generally use a microscope objective lens to collect light transmitted through or reflected light from an object. A skilled artisan recognizes that the Rayleigh limit-of-resolution, $L_R$, (how small of a feature a microscope may resolve) is based on the following equation:

$$L_R = \frac{0.61 \cdot \lambda}{NA}$$

where $\lambda$ is the wavelength of the light used to illuminate the object, and NA is the numerical aperture of the microscope objective lens. NA is related to the refractive index of a medium between the lens and the object, and the angle-of-light entering the lens:

$$NA = n \cdot \sin \theta$$

where n is the index-of-refraction of the medium in which the lens is operating (e.g., n is about equal to 1.00 for air, equal to about 1.33 for water, and equal to about 1.52 for high-refractive-index immersion oils); and $\theta$ is a maximal half-angle of a cone-of-light that can enter (or exit) the objective lens. Therefore, as the numerical aperture, NA, increases, the limit-of-resolution, $L_R$, decreases, thereby allowing inspection of smaller features, such as defects.

However, as NA increases, the depth-of-field (e.g., image depth) and the viewable area decreases significantly. For example, the depth-of-field, DOF, decreases by the square of the numerical aperture, NA, according to the following equation:

$$DOF = \frac{n \cdot \lambda}{NA^2}$$

Consequently, as the limit-of-resolution decreases (allowing interrogations of increasingly smaller feature sizes), the depth-of-field decreases even faster. The viewable area also decreases commensurately. Therefore, the disclosed subject matter presents a system that allows interrogation of small features but with a large depth-of-field and a large inspection area.

For example, the apparatuses and methods of the disclosed subject matter can inspect the entire surface of the part, with similar resolution to standard microscopy-based systems of the prior art, in less than about 30 minutes, giving a greater than about 13,000 times increase in efficiency over the sampled about 0.0003% to about 0.0007% described above and thereby provide a significant improvement in confidence of the measurement of up to approximately about 95% to about 99.9997% level of confidence.

Various embodiments of the disclosed subject matter operate in a reflective mode to inspect, for example, hard-matter surfaces (e.g., non-biological such as inorganic or non-organic matter). The surfaces may include, for example, various metallic (e.g., aluminum or stainless steel), ceramic alumina, $Al_2O_3$) surfaces, ceramic-coated surfaces, elemental and compound semiconductor substrate surfaces, various types of plastics, glass surfaces (of various types known in the art), anodized surfaces, and oxidized surfaces, although many other types of surfaces and materials can be inspected using embodiments of the disclosed subject matter. In one example, the part may be approximately 559 mm (approximately 22 inches, having a surface area on one side of about 0.25 m²) in diameter (or other characteristic areal dimension) and the part may be inspected fib defects having a characteristic dimension of approximately about 5 μm to about 10 μm and larger. In other embodiments, the part may be inspected for defects having a characteristic dimension of approximately about 5 μm to about 10 μm and larger over an area of up to several square meters.

Various embodiments of the disclosed subject matter can also be used to, for example, identify material-composition changes, crystal-structure changes, or grain boundaries within a material. Materials with different compositions or different crystal structures have a different refractive index as a property of the material. The refractive index affects how light reflects off and refracts through the material. Consequently, various refractive indices produce different intensities of light impinging on the sensor, thereby allowing for detection of, for example, compositional or structural boundaries. In addition, if the grain size of the material, such as a ceramic or metal, is on the order of a micron, grain boundaries and other defects that normally require much higher magnification to view are detectable using various embodiments of the disclosed subject matter. Further, light scattered at grain boundaries taken from multiple angles of light could produce an image identifying grain boundary information in addition to larger defects on a larger scale than traditional optics can detect or identify.

The disclosed subject matter utilizes a camera with a large field-of-view while still obtaining high resolution. Embodiments of the described apparatus use incident light at multiple angles, both spatially generated and temporally generated, which are then computationally combined to increase the resolution while doing so over a large surface area of the part to be inspected. Due to the large number of incident light-beams impinging on the surface of the inspected part, artifacts from a typical single, high-intensity light beam are also reduced or eliminated. The disclosed apparatus can use statistics and machine learning to only interrogate part of the surface while having a high confidence as to the quality of the entire surface. Further, various embodiments of the disclosed subject matter can be modified with various types of lenses (e.g., objective lenses) and wavelengths to meet a specific application for which it is needed. Additionally, the various embodiments described herein could be automated to scan the entire surface. For example, in one embodiment, to increase the inspected surface area, the RFPM device may be raster scanned or otherwise moved to different portions of the surface to be inspected. In another embodiment, the surface may be translated relative to the RFPM device. In still other embodiments, the RFPM device is raster scanned and the surface is concurrently translated relative to the RFPM device. Further, the various embodiments may have predetermined criteria for a passable part, thereby eliminating the need for interpretation of one or more defects detected by an operator.

In a specific exemplary embodiment, the disclosed subject matter comprises a reflective-mode Fourier ptychography microscopy (RFPM) apparatus. The RFPM apparatus operates in reflective mode utilizing a multiple-component light source (e.g., an LED array or other source of radiation), a lens containing collection optics to receive specular and scattered light (light reflected or otherwise redirected from the surface), from an object undergoing inspection, and a reflected-light sensor. In various embodiments, the reflected-light sensor may be offset by a certain number of degrees from vertical (orthogonal to the surface). The system takes multiple images with different lighting conditions (e.g., half-circle illumination of the multiple-component light source) in both brightfield-imaging and darkfield-imaging to sample the Fourier space of an image of the surface. These images are then computationally reconstructed and overlaid to increase resolution and decrease aberrations. After reconstruction, the images are interrogated for defects using machine-learning algorithms and part quality is determined based on predetermined criteria.

Figures 2, 3A:
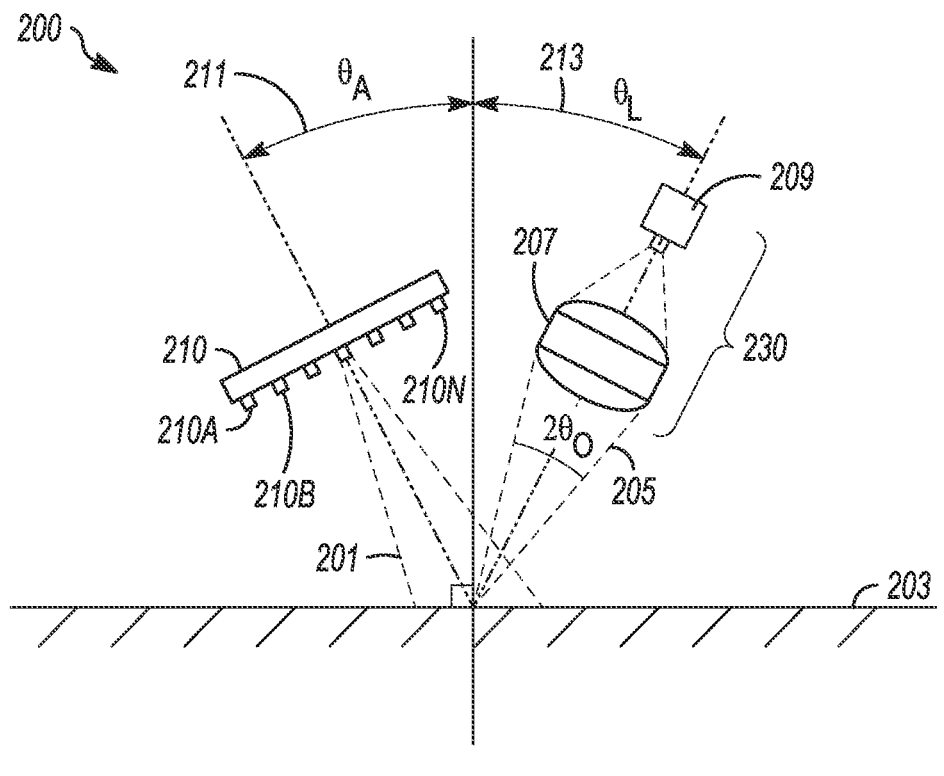
FIG. 2 shows an exemplary embodiment of a diagram of a reflective-mode Fourier ptychographic microscope (RFPM) apparatus in accordance with various embodiments of the disclosed subject matter.
FIG. 3A shows another exemplary embodiment of a diagram of an RFPM apparatus in accordance with various embodiments of the disclosed subject matter.

With reference now to FIG. 2, an exemplary embodiment of a diagram of a reflective-mode Fourier ptychographic microscope (RFPM) apparatus 200 in accordance with various embodiments of the disclosed subject matter is shown. The RFPM apparatus 200 is shown to include a light-source array 210, collection optics 230, and a sample surface 203. The light-source array 210 includes a number of individual-light sources 210A, 210B, . . . , 210N. In various embodiments, the individual-light sources 210A, 210B, . . . , 210N may each comprise a number of substantially-monochromatic light sources. The light-source array 210 may comprise individual-light sources having one or more wavelengths, one or more polarization states, or other characteristics. In a specific exemplary embodiment, the individual-light sources 210A, 210B, . . . , 210N comprise individual LEDs at a specific wavelength or clusters of LEDs that are each tunable for a correlated color temperature (CCT) or range of wavelengths including non-visible colors (e.g., ultraviolet or infrared). In various embodiments, the individual-light sources may comprise other types of non-visible sources having wavelengths extending deep into the ultraviolet range. Regardless of the type of light utilized, each of the individual-light sources 210A, 210B, . . . , 210N are programmable and capable of being activated separately (turned on or off).

The collection optics 230 includes an imaging lens 207 and a sensor element 209. Although the imaging lens 207 is shown to be a biconvex lens, no such limitation is implied as the imaging lens 207 may comprise one or more of a variety of lenses, or lens groups, as is known in the art. The imaging lens 207 is shown to have a full-angle of a cone-of-light 205 entering the lens. In specific exemplary embodiments, the imaging lens 207 may be substituted or used in conjunction with other optical elements, such as mirrors. In a specific exemplary embodiment, the collection optics 230 comprises a microscope objective lens. The sensor element 209 may comprise various types of light-sensing elements known in the art that convert received light-energy into an electrical-signal output (e.g., a photodetector). In a specific exemplary embodiment, the sensor element 209 comprises a CCD-array.

The light-source array 210 can be placed at an angle 211 with reference to the sample surface 203. The angle 211 may be fixed or variable, depending on a number of factors understandable to a person of ordinary skill in the art. In various embodiments, the angle 211 may be from at or near 0° to about 2°, to about 3°, to about 5° or greater. Further, each of the individual-light sources 210A, 210B, . . . , 210N may have various amounts of beam spread 201. The beam spread may be from at or near 0° (e.g., for a laser or LED source) or may be greater than 0° for other types of light source.

The collection optics 230 can be placed at an angle 213 with reference to the sample surface 203. The angle 213 may be fixed or variable, depending on a number of factors understandable to a person of ordinary skill in the art. In various embodiments, the angle 213 may be from at or near 0° to about 2°, to about 3°, to about 5° or greater. In a specific exemplary embodiment, the angle 213 is about equal to the angle 211 of the light-source array 210. The collection optics 230 of the RFPM apparatus 200 collects reflections that are reflected or scattered back from the sample surface 203 towards the collection optics 230.

Therefore, each of a series of images are captured as a result of the illumination from, for example, a coherent light source. However, due to the multiple light sources, there are multiple angles-of-incidence, many of which are available substantially simultaneously. Various types of temporal or spatial patterning of the lights may be employed by RFPM apparatus 200 to collect the series of images.

Therefore, various imaging modalities are achieved using the same optical setup of FIG. 2, in various embodiments with no moving parts, simply by choosing appropriate ones of the individual-light sources 210A, 210B, . . . , 210N (e.g., LEDs) within the light-source array 210 to be activated (turned on and off) according to predefined, temporal and spatial patterns. Consequently, each of the individual-light sources, or patterns of multiple ones of the individual-light sources within the light-source array 210 corresponds to illumination of the sample surface 203 at a unique angle or range of angles. Therefore, a range of illumination angles that can be patterned is much larger than a range of angles that pass through the collection optics 230 and is therefore not set by a numerical aperture of the collection optics 230. As a result, the illumination of the sample surface 203 by the individual-light sources closer to a central region of the light-source array 210 produce brightfield images, whereas illumination of the sample surface 203 by individual-light sources closer to an outer periphery of the light-source array 210 (outside the numerical aperture of the collection optics 230) produce darkfield images. Brightfield images and dark field images are known and understood by a person of ordinary skill in the art.

Sequentially taking a pair of images with, for example, LEDs on either half of the light-source array 210 (e.g., across a selected line-of-symmetry), allows the RFPM apparatus 200 to obtain phase-derivative measurements by differential-phase contrast (DPC) techniques. Using DPC techniques, quantitative phase differences from images captured with different source patterns from the light-source array 210 are obtained. Thus, quantitative phase is recovered from, for example, two images, as taken with complementary asymmetric-illumination patterns. The difference between the two images is related to the phase derivative of the sample surface 203 along an axis-of-asymmetry. The DPC technique is therefore a partially-coherent imaging technique (only illumination from a single one of the LEDs comprise a coherent light source). Due to various patterning techniques that can be implemented using the light-source array 210, DPC measurements can be implemented in the RFPM apparatus 200 in substantially real-time and along numerous axes-of-asymmetry, without using any movable parts. Therefore, implementing DPC techniques is possible without any mechanical alterations on either from illumination side (the light-source array 210 side) or on the detection (back-reflected or scattered) side (the collection optics 230 side) of the RRPTM apparatus. Accordingly, various illumination strategies of the light-source array 210 can be developed to accommodate different types of specimens and imaging needs.

A person of ordinary skill in the art recognizes, in the general art of optics and light scattering, that height information can be extracted from taking the phase difference or phase differences of multiple images and using this information to extract a height characteristic (e.g., a characteristic height-dimension of a defect). In reflective microscopy using brightfield images, for example, two half-moon illuminations (e.g., left, right or top, bottom) can be taken. In an off-axis illumination situation, the phase will vary substantially linearly with contrast. In a single image, however, both phase information and amplitude information are inseparably convolved within a resulting signal and, consequently, the phase cannot be extracted separately from the signal. Multiple images from different angles will have the same amplitude contrast but different phase contrasts. Therefore, when the difference between the images is taken, the phase contrast can be isolated.

Phase can be related to height or depth in reflection mode by the equation $$\varphi = 2k_z h$$

where $\varphi$ is the phase of the received signal, $k_z$ is the wave vector in the z-direction, and h is the height of a feature-of-interest. The wave vector, $k_z$, can be determined by $$k_z = \frac{2\pi \cos(\theta)}{\lambda}$$

where $\theta$ is the angle between the imaging axis and the illumination point (if straight up and down it is the angle between vertical and wherever the LED is located) and $\lambda$ is the wavelength of the light. Therefore, if the phase can be determined by the image, the angle of illumination and the wavelength of light are known, then a relative height map can be determined. This will indicate whether defects are above or below the generally flat plane of the part or below.

The description provided above is valid generally for single reflections (not transmitted signals), although a similar set of math, although more complicated, can be used to extract similar information from transmitted signals. In the case of a transparent coating on a solid surface, various types of reflections may be encountered. However, a person of ordinary skill in the art will recognize how such reflections may be included in the equations given above.

Referring now to FIG. 3A, another exemplary embodiment of a diagram of an RFPM apparatus 300 in accordance with various embodiments of the disclosed subject matter is shown. The RFPM apparatus 300 is shown to include a left-side light-source array 3101, and a right-side light-source array 310R. Each of the light-source arrays 310L, 310R include a number of individual light sources (not shown but may be the same as or similar to the light-source array 210 of FIG. 2). The left-side light-source array 310L and the right-side light-source array 310R may be at one or more angles 301L and 301R, respectively. Each of the left-side light-source array 310L and the right-side light-source array 310R may be at one or more angles 301L and 301R that are different with reference to the angle on the opposing side. The respective angles 301L and 301R for each of the left-side light-source array 310L and the right-side fight-source array 310R may be fixed or variable. Additionally, although not shown explicitly, the RFPM apparatus 300 may include a beamsplitter element such that at least one of the light-source arrays 310-L, 310R may be arranged substantially orthogonally to a beam path of the collection optics 230. Such beamsplitter designs are known in the relevant art. In other embodiments, the light-source arrays may surround the collection optics 230 and be located in a device that houses the collection optics 230. Further, although FIG. 3A implies that the left-side light-source array 310L and the right-side light-source array 310R are planar elements, no such limitation should be inferred as discussed below with reference to FIGS. 3B and 3C.

Figure 3B:
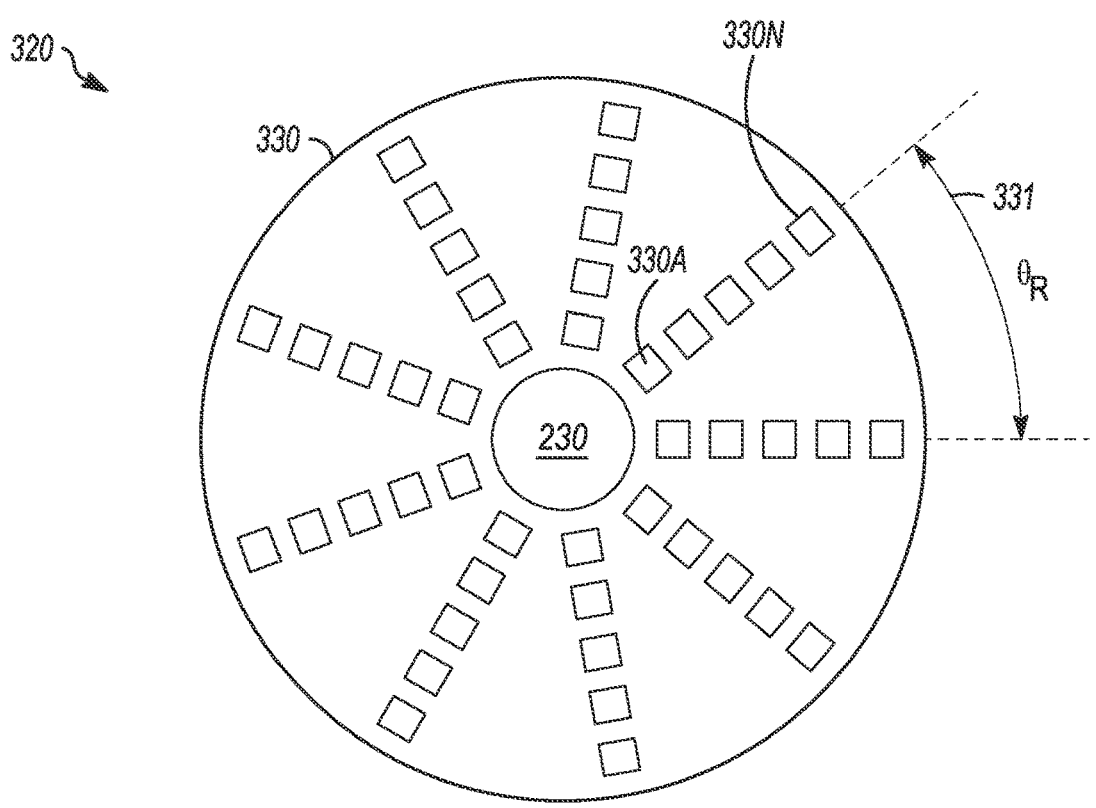
FIGS. 3B and 3C show exemplary embodiments of arrangements of light sources that may be used with the RFPM apparatus of FIG. 3A.
Figure 3C:
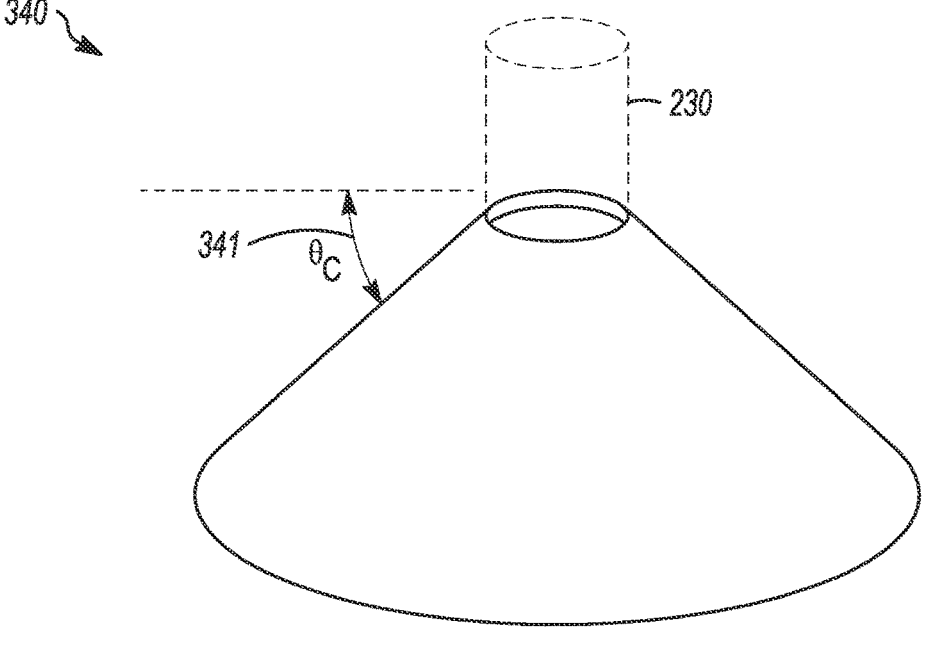

FIGS. 3B and 3C show exemplary embodiments of arrangements of light sources that may be used with the RFPM apparatus 300 of FIG. 3A. FIG. 3B shows an arrangement 320 of a light-source array 330 having a number of individual-light sources 330A, 330B, . . . , 330N. Consequently, a lowermost portion (e.g., an underside of the light-source array 330, which is most proximate to the surface) is shown. An angle 331 between adjacent rows of the individual-light sources 330A, 330B, . . . , 330N may be determined based on a number of individual ones of the light sources required for a given size and other characteristics of a surface to be inspected. Although the angle 331 is shown to have adjacent rows of the individual-light sources 330A, 330B, . . . , 330N spaced approximately 45° from one another, no such limitation on the angle 331 should be inferred.

Also, the individual-light sources 330A, 330B, . . . , 330N may not be arranged in linear arrays. The individual-light sources may be arranged in various spatially-periodic and non-spatially-periodic (including random) arrays. For example, in a specific exemplary embodiment, the individual-light sources are arranged in a series of concentric circles where each adjacent row has the same number of individual-light sources as the previous or subsequent row. In another specific exemplary embodiment, the individual-light sources are arranged in a series of concentric circles where each adjacent row has more or fewer numbers of individual-light sources as the previous or subsequent row. In still another specific exemplary embodiment, the individual-light sources are arranged in an Archimedes spiral or other geometric arrangement. Additionally, the light-source array 330 may comprise a locally-planar surface (e.g., from an inner to an outer periphery of the array). In other embodiments, the light-source array 330 may comprise a concave or a convex surface, or any of the geometric combinations listed or considered.

For example, FIG. 3B shows a three-dimensional side view 340 of an arrangement of the RFPM apparatus 300 of FIG. 3A. In this side view, the RFPM apparatus 300 is shown to have a shape that is substantially frustoconical. An angle 341 may be from at or near 0° to 45° or more.

Based on upon reading and understanding the disclosed subject matter, a person of ordinary skill in the art will recognize that each of the various embodiments of the RFPM apparatus may be used to measure defects at various sizes, on surfaces of various materials, and over large surface areas (e.g., from fractions of a square meter up to several square meters or more). In the case of very large surfaces, the RFPM apparatus may be mounted on various types of translation stages (e.g., an x-y stage or an R-θ stage), known in the relevant art. In other embodiments, the sample itself may be translated relative to the RFPM apparatus. In still other embodiments, the sample and the RFPM apparatus may both be translated relative to each other. Each of the resulting acquired images may then be processed and stitched together through, for example, software, to form a single image. A size range of detected defects can be from about 50 nm to about 50 mm of a characteristic dimension of the detected defect. A total number of detected defects (e.g., over a predetermined size such as about 5 μm or about 10 μm) per unit area can be detected. Additionally, the various embodiments can be used to determine an overall roughness level (e.g., an RMS-roughness value, $R_{RMS}$) of all or portions of the surface.

In still other embodiments, not shown explicitly but understandable to a person of ordinary skill in the art, based on upon reading and understanding the disclosed subject matter, various embodiments of the disclosed subject matter may also be used in various process stages of semiconductor fabrication. For example, the disclosed subject matter may be used, in-situ, within or proximate to a deposition-process chamber to monitor defects, film thicknesses, and film roughness levels as a film or films are being deposited on a substrate (e.g., a silicon wafer). The results from such in-situ process monitoring may then be reported to an end user in substantially real-time or acquired and reported as a series of temporal images.

Using one or more of the various embodiments disclosed herein, one embodiment using various embodiments of the RFPM includes, for example, (1) An operator of the RFPM manually loads a part to be inspected onto a fixture that secures orientation of the part;

(2) The operator selects and starts a program to run and control at least some of the aspects of the RFPM described above, the program may be rim with a human-machine interface or other graphical user-interface;

(3) The RFPM captures images of the part automatedly (e.g., 1 μm and larger 500 μm defects can both be detected substantially simultaneously) across the entirety of the surface of the part or across predetermined portions (e.g., a given percentage of the part that is sampled in stated locations);

(4) Once the requested data are collected, computational methods, known in the relevant art are used to process the images with, for example, machine learning being used to analyze and quantify defects; and (5) Based on a predetermined set of inputs (e.g., a number of defects at or greater than a predetermined size per unit area, a level of roughness over a fraction or entirety of the part scanned, and other inputs and parameters described herein), the program Computer determines if the part passes or fails inspection based on program and defects analyzed.

Such methods as described above may be run on various types of devices as described below in more detail. The devices include, for example, a computer or microprocessor, a special-purpose processor, such as a field programmable gate array (FPGA) or an application-specific integrated circuit (ASIC) that is programmed, in software, firmware, or as a hardware implementation, with one or more aspects of the disclosed subject matter described above.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC.

A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware-module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

As used herein, the term "or" may be construed in an inclusive or exclusive sense. Further, other embodiments will be understood by a person of ordinary skill in the art upon reading and understanding the disclosure provided. Further, upon reading and understanding the disclosure provided herein, the person of ordinary skill in the art will readily understand that various combinations of the techniques and examples provided herein may all be applied in various combinations.

Although various embodiments are discussed separately, these separate embodiments are not intended to be considered as independent techniques or designs. As indicated above, each of the various portions may be inter-related and each may be used separately or in combination with other embodiments of the reflective Fourier ptychography system discussed herein. For example, although various embodiments of methods, operations, and processes have been described, these methods, operations, and processes may be used either separately or in various combinations.

Consequently, many modifications and variations can be made, as will be apparent to a person of ordinary skill in the art upon reading and understanding the disclosure provided herein. Functionally equivalent methods and devices within the scope of the disclosure, in addition to those enumerated herein, will be apparent to the skilled artisan from the foregoing descriptions. Portions and features of some embodiments may be included in, or substituted for, those of others. Such modifications and variations are intended to fall within a scope of the appended claims. Therefore, the present disclosure is to be limited only by the terms of the appended claims, along with the full scope of equivalents to which such claims are entitled. It is also to be understood that the terminology used herein is for the purpose of describing particular embodiments only and is not intended to be limiting.

The Abstract of the Disclosure is provided to allow the reader to quickly ascertain the nature of the technical disclosure. The abstract is submitted with the understanding that it will not be used to interpret or limit the claims. In addition, in the foregoing Detailed Description, it may be seen that various features may be grouped together in a single embodiment for the purpose of streamlining the disclosure. This method of disclosure is not to be interpreted as limiting the claims. Thus, the following claims are hereby incorporated into the Detailed Description, with each claim standing on its own as a separate embodiment.

THE FOLLOWING NUMBERED EXAMPLES
ARE SPECIFIC EMBODIMENTS OF THE
DISCLOSED SUBJECT MATTER

Example 1: An embodiment of the disclosed subject matter describes a method of operating a reflective-mode Fourier ptychographic microscope (WPM) to detect defects on a surface of a part. The method includes loading the part onto a holding fixture of the RFPM; generating at least one lighting pattern from a multiple-component light source configured to direct radiation on the surface, the multiple-component light source having a plurality of individual-light sources, each of which is configured to be activated individually, the at least one lighting pattern being selected from a plurality of patterns including temporal patterns and spatial patterns; collecting radiation redirected from the surface in a sensor element; obtaining phase-derivative measurements by differential-phase contrast (DPC) techniques from the radiation collected by the sensor element; determining an angle between an imaging axis from the surface to the sensor element: and determining at least a height characteristic of one or more defects on the surface.

Example 2: The method of claim 1, further comprising raster scanning the at least one generated light pattern over an area of the surface.

Example 3: The method of either Example 1 or Example 2, further comprising performing a raster scan over an area of the surface by moving the part under the at least one generated light pattern.

Example 4: The method of any one of the preceding Examples, further comprising performing a raster scan over an area of the surface by: scanning the at least one generated light pattern over the area of the surface; and moving the part under the at least one generated light pattern.

Example 5: The method of any one of the preceding Examples, wherein the area, is selected to be at least about 0.25 square meters over the surface.

Example 6: The method of any one of the preceding Examples, further comprising determining at least one wavelength for selected ones of the plurality of individual-light sources.

Example 7: The method of any one of the preceding Examples, wherein the at least one lighting pattern is selected to illuminate the surface at a number of incidence angles.

Example 8: The method of any one of the preceding Examples, wherein the temporal patterns and the spatial patterns are pre-determined.

Example 9: The method of any one of the preceding Examples, wherein selecting the temporal pattern includes: selecting which of the plurality of individual-light sources to activate; and determining which of the selected plurality of individual-light sources are activated, in time, relative to remaining ones of the selected plurality of individual-light sources.

Example 10: The method of any one of the preceding Examples, wherein selecting the spatial pattern comprises selecting which of the plurality of individual-light sources to activate during a substantially-uniform time period.

Example 11: The method of any one of the preceding Examples, further comprising determining an angle from which a midpoint of the at least one generated light pattern is offset from normal by a pre-determined number of degrees from vertical with reference to the surface.

Example 12: The method of any one of the preceding Examples, further comprising combining computationally at least one of radiation collected that is redirected from the surface to increase a resolution of the detected defects over a Rayleigh limit-of-resolution for a given numerical aperture and wavelength of light of the plurality of individual-lighting sources.

Example 13: The method of any one of the preceding Examples, further comprising selecting collection optics to focus the collected radiation onto the sensor element from a pre-determined numerical aperture.

Example 14: The method of any one of the preceding Examples, wherein the multiple-component light source comprises an LED array.

Example 15: The method of any one of the preceding Examples, wherein the generating of at least one lighting pattern comprises selecting ones of the plurality of individual-light sources to include a group of LEDs from an LED array.

Example 16: The method of any one of the preceding Examples, wherein each of the number of individual-light sources comprises an LED.

Example 17: An embodiment of the disclosed subject matter describes a method of operating a reflective-mode Fourier ptychographic microscope (RFPM). The method includes loading a non-biological part to be inspected onto a fixture; and selecting a program to run and control one or more aspects of the RFPM, the aspects being selectable from aspects including a spatial pattern of a multiple-component light source, a temporal pattern of the multiple-component light source, a range of defect sizes to be detected, an area of the part to be inspected, at least one height characteristic for one or more detected defects, and a number of images of the non-biological part to record.

Example 18: The method of Example 17, further comprising determining a level of roughness of at least a portion of the area of the part based on the recorded images.

Example 19: The method of either Example 17 or Example 18, further comprising selecting a size range of defects to be detected.

Example 20: The method of any one of Example 17 through Example 19, further comprising selecting a range of angles at which the multiple-component light source directs radiation to the part.

Example 21: The method of any one of Example 17 through Example 20, wherein the non-biological part includes at least one material selected from materials including metallic surfaces, ceramic surfaces, ceramic-coated surfaces, elemental semiconductor substrate surfaces, compound semiconductor substrate surfaces, glass surfaces, anodized surfaces, plastics, and oxidized surfaces.

Example 22: The method of any one of Example 17 through Example 21, wherein the size range of defects to be detected includes a range from about 50 nm to about 50 mm of a characteristic dimension of the detected defect.

Example 23: An embodiment of the disclosed subject matter describes a method of operating a reflective-mode Fourier ptychographic microscope (RFPM) to detect defects on a surface of a part. The method includes generating at least one lighting pattern from a multiple-component light source configured to direct radiation on the surface, the multiple-component light source having a plurality of individual-light sources, each of the plurality of individual-light sources is configured to be activated individually, the at least one lighting pattern being selected from temporal patterns and spatial patterns; using both brightfield-imaging and darkfield-imaging to sample a Fourier space of an image of the surface; collecting radiation redirected from the surface in a sensor; obtaining phase-derivative measurements by differential-phase contrast (DPC) techniques in an area proximate the defect from the redirected radiation collected by the sensor; determining an angle between an imaging axis from the surface to the sensor; and determining at least a height characteristic of one or more defects on the surface.

Example 24: The method of Example 23, wherein a characteristic dimension of the detected defects is about 5 μm and larger in size over an area of up to several square meters.

Example 25: The method of either of Example 23 and Example 24, wherein the part is a non-biological part.

Example 26: The method of Example 25, wherein the non-biological part includes at least one material selected from materials including metallic surfaces, ceramic surfaces, ceramic-coated surfaces, elemental semiconductor substrate surfaces, compound semiconductor substrate surfaces, glass surfaces, anodized surfaces, plastics, and oxidized surfaces.

Example 27: The method of any one of Example 23 through Example 26, wherein the spatial pattern is selected to illuminate the surface at a number of incidence angles substantially simultaneously during a time period for a selected spatial pattern.

Example 28: The method of any one of Example 23 through Example 27, wherein selecting the temporal pattern comprises: selecting which of the plurality of individual-light sources to activate; and determining which of the selected plurality of individual-light sources are activated, in time, relative to remaining ones of the selected plurality of individual-light sources.

Example 29: The method of any one of Example 23 through Example 28, wherein selecting the spatial pattern comprises selecting which of the plurality of individual-light sources to activate during a substantially-uniform time period.

What is claimed is:

1. A method of operating a reflective-mode Fourier ptychographic microscope (RFPM) to detect defects on a surface of a part, the method comprising:

loading the part onto a holding fixture of the RFPM;

generating, by using a programmable controller, at least one predetermined lighting pattern from a multiple-component light source configured to direct radiation on the surface, the multiple-component light source having a plurality of individual-light sources, each of which is configured to be activated individually, the at least one generated predetermined lighting pattern being selected from a plurality of patterns including temporal patterns and spatial patterns, the temporal patterns and the spatial patterns of the predetermined lighting pattern being computationally combined to increase a resolution of the detected defects over a Rayleigh limit-of-resolution for a given numerical aperture and wavelength of light;

collecting radiation redirected from the surface in a sensor element, the plurality of patterns of the temporal patterns and the spatial patterns to be generated by selecting individual ones of the multiple-component light source to be activated to illuminate the part at a range of predefined angles-of-incidence;

obtaining phase-derivative measurements by differential-phase contrast (DPC) techniques from the radiation collected by the sensor element;

determining an angle between an imaging axis from the surface to the sensor element; and determining at least a height characteristic of one or more defects on the surface.

2. The method of claim 1, further comprising raster scanning the at least one generated predetermined lighting pattern over an area of the surface.

3. The method of claim 1, further comprising performing a raster scan over an area of the surface by moving the part under the at least one generated predetermined lighting pattern.

4. The method of claim 1, further comprising performing a raster scan over an area of the surface by:

scanning the at least one generated predetermined lighting pattern over the area of the surface; and moving the part under the at least one generated predetermined lighting pattern.

5. The method of claim 1, wherein an area over an area of the surface to be inspected is selected to be at least about 0.25 square meters over the surface.

6. The method of claim 1, further comprising determining at least one wavelength for selected ones of the plurality of individual-light sources.

7. The method of claim 1, wherein the at least one predetermined lighting pattern is selected to illuminate the surface at a number of incidence angles.

8. The method of claim 1, wherein the temporal patterns and the spatial patterns are pre-determined.

9. The method of claim 1, wherein selecting the temporal pattern includes:

selecting which of the plurality of individual-light sources to activate; and determining which of the selected plurality of individual-light sources are activated, in time, relative to remaining ones of the selected plurality of individual-light sources.

10. The method of claim 1, wherein selecting the spatial pattern comprises selecting which of the plurality of individual-light sources to activate during a substantially-uniform time period.

11. The method of claim 1, further comprising setting an angle from which a midpoint of the at least one generated predetermined lighting pattern is offset from normal by a pre-determined number of degrees from vertical with reference to the surface, the angle being an angle-of-incidence of at least a portion of the at least one generated predetermined lighting pattern.

12. The method of claim 1, further comprising combining computationally at least one of radiation collected that is redirected from the surface to increase the resolution of the detected defects over the Rayleigh limit-of-resolution for the given numerical aperture and wavelength of light of the plurality of individual-lighting sources.

13. The method of claim 1, further comprising selecting collection optics to focus the collected radiation onto the sensor element from a pre-determined numerical aperture.

14. The method of claim 1, wherein the multiple-component light source comprises an LED array.

15. The method of claim 14, wherein the generating of at least one predetermined lighting pattern comprises selecting ones of the plurality of individual-light sources to include a group of LEDs from the LED array.

16. The method of claim 1, wherein each of the plurality of individual-light sources comprises an LED.

17. A method of operating a reflective-mode Fourier ptychographic microscope (RFPM), the method comprising:

loading a non-biological part to be inspected onto a fixture; and selecting a program to run and control one or more predetermined aspects of the RFPM, the predetermined aspects being selectable from aspects including a spatial pattern of a multiple-component light source, a temporal pattern of the multiple-component light source, a range of defect sizes to be detected, an area of the part to be inspected, at least one height characteristic for one or more detected defects, and a number of images of the non-biological part to record, the spatial patterns and the temporal patterns to be generated by selecting individual ones of the multiple-component light source to be activated to illuminate the part at a range of predefined angles-of-incidence, the temporal patterns and the spatial patterns of further being computationally combined to increase a resolution of the detected defects over a Rayleigh limit-of-resolution for a given numerical aperture and wavelength of light; and obtaining phase-derivative measurements by differential-phase contrast (DPC) techniques from the radiation collected by the sensor element.

18. The method of claim 17, further comprising determining a level of roughness of at least a portion of the area of the part based on the recorded images.

19. The method of claim 17, further comprising selecting a size range of defects to be detected.

20. The method of claim 17, further comprising selecting a range of angles at which the multiple-component light source directs radiation to the part.

21. The method of claim 17, wherein the non-biological part includes at least one material selected from materials including metallic surfaces, ceramic surfaces, ceramic-coated surfaces, elemental semiconductor substrate surfaces, compound semiconductor substrate surfaces, glass surfaces, anodized surfaces, plastics, and oxidized surfaces.

22. The method of claim 17, wherein the size range of defects to be detected includes a range from about 50 nm to about 50 mm of a characteristic dimension of the detected defect.

23. A method of operating a reflective-mode Fourier ptychographic microscope (RFPM) to detect defects on a surface of a part, the method comprising:

generating, by using a programmable controller, at least one predetermined lighting pattern from a multiple-component light source configured to direct radiation on the surface, the multiple-component light source having a plurality of individual-light sources, each of the plurality of individual-light sources is configured to be activated individually, the at least one predetermined lighting pattern being selected from temporal patterns and spatial patterns, the temporal patterns and the spatial patterns to be generated by selecting individual ones of the multiple-component light source to be activated to illuminate the part at a range of predefined angles-of-incidence, the temporal patterns and the spatial patterns of the predetermined lighting pattern further being computationally combined to increase a resolution of the detected defects over a Rayleigh limit-of-resolution for a given numerical aperture and wavelength of light;

using both brightfield-imaging and darkfield-imaging to sample a Fourier space of an image of the surface;

collecting radiation redirected from the surface in a sensor;

obtaining phase-derivative measurements by differential-phase contrast (DPC) techniques in an area proximate the defect from the redirected radiation collected by the sensor;

determining an angle between an imaging axis from the surface to the sensor; and determining at least a height characteristic of one or more defects on the surface.

24. The method of claim 23, wherein a characteristic dimension of the detected defects is about 5 µm and larger in size over an area of up to several square meters.

25. The method of claim 23, wherein the part is a non-biological part.

26. The method of claim 25, wherein the non-biological part includes at least one material selected from materials including metallic surfaces, ceramic surfaces, ceramic-coated surfaces, elemental semiconductor substrate surfaces, compound semiconductor substrate surfaces, glass surfaces, anodized surfaces, plastics, and oxidized surfaces.

27. The method of claim 23, wherein the spatial pattern is selected to illuminate the surface at a number of incidence angles substantially simultaneously during a time period for a selected spatial pattern.

28. The method of claim 23, wherein selecting the temporal pattern comprises:

selecting which of the plurality of individual-light sources to activate; and determining which of the selected plurality of individual-light sources are activated, in time, relative to remaining ones of the selected plurality of individual-light sources.

29. The method of claim 23, wherein selecting the spatial pattern comprises selecting which of the plurality of individual-light sources to activate during a substantially-uniform time period.

\* \* \* \* \*